US008358745B2

(12) United States Patent
Angel et al.

(10) Patent No.: US 8,358,745 B2
(45) Date of Patent: Jan. 22, 2013

(54) RECORDING IDENTITY DATA TO ENABLE ON DEMAND SERVICES IN A COMMUNICATIONS SYSTEM

(75) Inventors: Albert Angel, N. Miami Beach, FL (US); Lesli Angel, N. Miami Beach, FL (US); Thilo Rusche, Arlington, VA (US); Aron Leibowich, Weston, FL (US); Scott Snyder, Umatilla, FL (US); Rica A. Leibowich, Weston, FL (US); Arthur Rosenberg, Reston, VA (US)

(73) Assignee: Certicall, LLC, N. Miami, FL (US)

( * ) Notice: Subject to any disclaimer, the term of this patent is extended or adjusted under 35 U.S.C. 154(b) by 0 days.

(21) Appl. No.: 13/023,892

(22) Filed: Feb. 9, 2011

(65) Prior Publication Data

US 2012/0201361 A1    Aug. 9, 2012

(51) Int. Cl.
    *H04M 1/64*    (2006.01)
(52) U.S. Cl. ............................................ 379/85; 379/74
(58) Field of Classification Search .................. 379/67.1, 379/68, 74, 85, 201.01, 201.02, 207.02
    See application file for complete search history.

(56) References Cited

U.S. PATENT DOCUMENTS

| 5,303,296 | A | 4/1994 | Zucker ............................ 379/67 |
| 5,647,834 | A | 7/1997 | Ron ................................ 600/23 |
| 6,222,909 | B1 * | 4/2001 | Qua et al. ..................... 379/88.22 |
| 6,529,602 | B1 * | 3/2003 | Walker et al. .................. 380/283 |
| 6,661,879 | B1 | 12/2003 | Schwartz et al. ........... 379/88.25 |
| 6,668,044 | B1 | 12/2003 | Schwartz et al. ............... 379/68 |
| 6,754,181 | B1 | 6/2004 | Elliott et al. .................... 370/252 |
| 6,792,604 | B1 | 9/2004 | Hickson et al. ............... 719/312 |
| 6,907,408 | B2 | 6/2005 | Angel .............................. 705/64 |
| 6,987,841 | B1 | 1/2006 | Byers et al. ................. 379/88.17 |
| 7,502,448 | B1 * | 3/2009 | Elman et al. ...................... 379/68 |
| 7,823,135 | B2 | 10/2010 | Horning et al. ................ 717/127 |
| 2002/0120544 | A1 | 8/2002 | Butcher .......................... 705/36 |
| 2006/0112279 | A1 | 5/2006 | Cohen et al. .................... 713/86 |
| 2007/0067385 | A1 | 3/2007 | D'Angelo et al. ............. 709/203 |
| 2007/0185718 | A1 | 8/2007 | Di Mambro et al. ......... 704/273 |
| 2007/0211876 | A1 | 9/2007 | Othmer et al. ........... 379/201.01 |
| 2008/0091425 | A1 | 4/2008 | Kane ............................. 704/246 |
| 2009/0037870 | A1 | 2/2009 | Santos-Gomez ............. 717/101 |
| 2009/0306981 | A1 | 12/2009 | Cromack et al. .............. 704/235 |

OTHER PUBLICATIONS

PCT Search Report, Oct. 21, 2011.
Related Co-pending U.S. Appl. No. 12/786,456, filed May 18, 2010.
IBM Research Report, "Content Immutable Storage: Truly Trustworthy and Cost-Effective storage for Electronic Records" Windsor W. Htsu, et al., Oct. 18, 2004.
3CX Phone System for Windows—http://www.voip-info.org/wiki/view/SIP.
User Datagram Protocol—http://en.wikipedia.org/wiki/User_Datagram_Protocol.

* cited by examiner

*Primary Examiner* — Olisa Anwah
(74) *Attorney, Agent, or Firm* — Robert C. Kain, Jr.

(57) ABSTRACT

Recording identity data enables telecomm system to provide on-demand services such as Record-ON (RCD), index, bookmark, transcribe, translate and supplement the recording. Party identity uses sender metadata in telecomm data packets. At log-in the station assigns on-demand command (CMD) control tokens and control transfer tokens to each party based on the party's profile. One party has RCD-CMD enabled and, if both parties have a RCD-CMD Transfer Token, parties can transfer RCD-CMD to all. In the absence of RCD-CMD or Transfer, a party cannot activate On-Demand services nor accept control CMD tokens. A call table-database links sender metadata and CMD permissions.

20 Claims, 8 Drawing Sheets

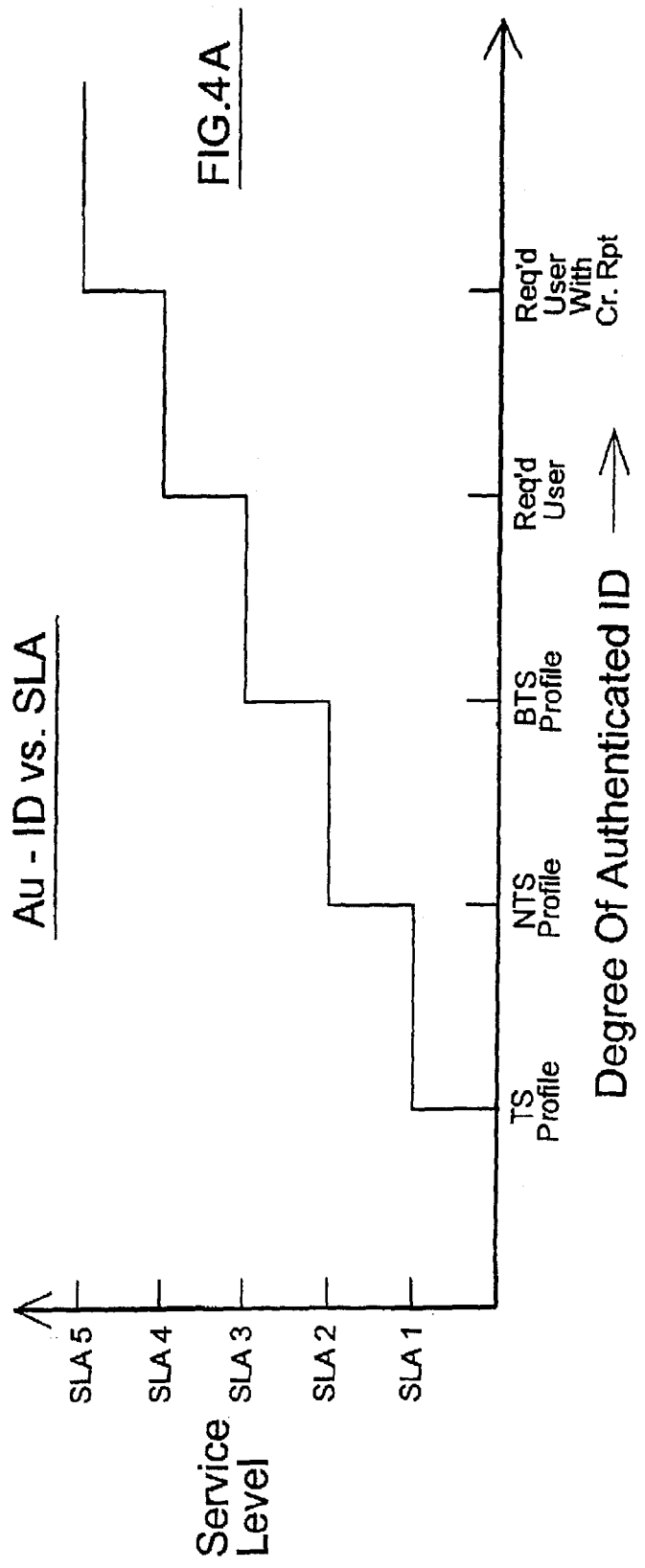

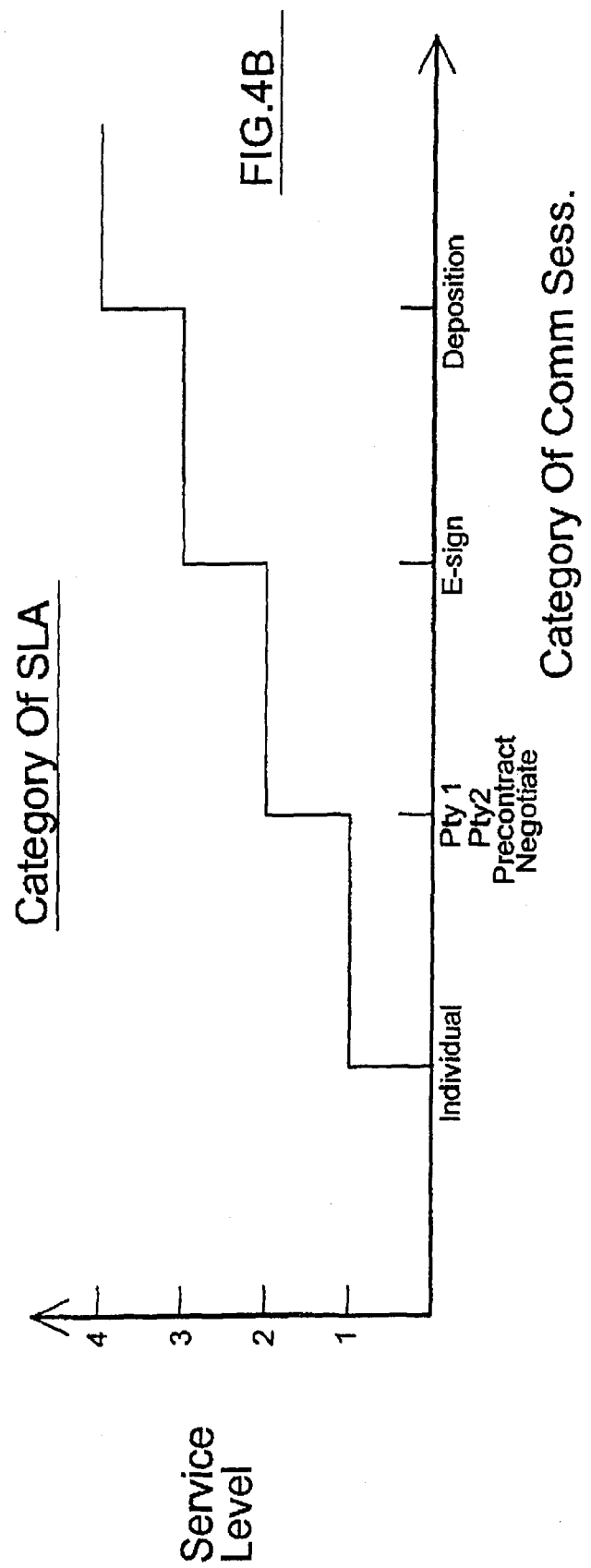

RECORDING IDENTITY DATA TO ENABLE ON DEMAND SERVICES IN A COMMUNICATIONS SYSTEM

U.S. patent Ser. No. 12/782,456, filed May 18, 2010 is a related patent application to the present patent specification and the contents of that pending patent application Ser. No. 12/782,456 is incorporated herein by reference thereto.

The present invention relates to a method and a system for recording identity data in a communications system to enable a communications station to provide on demand services to users activating telecommunications enabled devices in the communications system.

BACKGROUND OF THE INVENTION

With the widespread use of cellular telephones (cell phones) and smart phones, there is a need to provide on demand services to cell phone users via communications stations linked to the user's cell phones and telecommunications enabled devices. Oftentimes, users will speak on cell phones (enabled devices) and sometimes there is a need for on demand services that are not customarily provided by the telecommunications network, carriers or other service providers. The present invention fulfils this need to provide on demand services, in real time, without delay or substantial inconvenience to the users. A nominal user enrollment process enables these on demand services.

Prior art systems describe various recording platforms and methods for voice communications. See, for example U.S. Pat. No. 7,042,987 to Schwartz; U.S. Pat. No. 6,661,879 to Schwartz; and U.S. Pat. No. 6,668,044 to Schwartz. U.S. Pat. No. 6,987,841 to Byers discloses a method for providing a phone conversation recording system. This system verifies the identity of the telephone number of the calling party, sometimes referred to herein as a first communicating party, and establishes a communication with the called party, sometimes referred to herein as the second communicating party, records the voice communication and maintains a protected web based platform for accessing the stored audio file, deleting it, downloading it, as well as transmitting, via email and a URL (Uniform Resource Link), a communication to the communicating party to permit access to the audio file. Further, the email contains authentication information established by the calling or first communicating party. Byers also discloses a server hosting service and a website for carrying out the same. U.S. Patent Publication 2009/0306981 to Cromack discloses a method and a system for enhancing a conversation.

OBJECTS OF THE INVENTION

It is an object of the present invention to provide a method for recording identity data to enable on demand services in a communications system.

It is another object of the present invention to provide these on demand services based upon data and permissions in a user profile.

It is a further object of the present invention to provide these on demand services while collecting nominal authentication identity (AU-ID) data from the user.

It is a further object of the present invention to provide a method at the communications station which tracks all communications between two users who have activated the station services such that the communications station monitors on demand commands and token transfer commands thereby permitting the authorized user to activate an on demand service request and further to permit an authorized user to transfer the control token from a first user to a second user.

SUMMARY OF THE INVENTION

The method for recording identity data enables parties who participate in telecommunications session, sometimes referred to as first party Pty1, a second party Pty2, and otherwise sometimes identified as the calling party Pty1 and the called party Pty2, to request various on demand services when the telecommunications session is communicatively coupled to a communications station. These on demand services can encompass a variety of different services supplemental to the primarily recording facility which records, on demand, sound and voice information exchanged during a telecommunications session.

One on demand service is the recording of voice or sounds captured by telecommunications enabled devices such as cell phones, smart phones or internet appliances or computer operated by the calling party Pty1 and the called party Pty2. Other on demand services include transcription of the recorded voice record, translation the recorded voice record, archival operations to play previously recorded data, distribution of the recorded voice record and/or the transcribed or translated version of the recording, certification and authentication of the previously recorded material, emotional coding of the captured voice data, fact checking on demand services, profiling and electronic or e-sign confirmation of oral contracts and communications.

The method for recording identity data and enabling on demand services includes utilizing metadata which is included in the data packet carried by the telecommunications network during the telecommunications session. These data packets include, at a minimum, identifying information about the sending party and identifying information about the receiving party or the destination port. The "type of data" carried in the data packet is sometimes an available field and the "data content" itself (for example, in a data packet carrying voice data, the "data content" is the signals representing the captured voice sounds). The metadata important for the method of recording identity data and enabling on demand services is the metadata tag or port representing the sending party. The sending party's enabled device sends out the data packet with the captured audio data content. At the communications station once the participating party Pty1, Pty2 have logged into the communications station, the station assigns on demand control tokens to each of the parties based upon the user profiles of each of the parties. Therefore, in some situations, only one party Pty1 will be enabled and assigned an "on demand record" control token. As the communications station monitors all the data packets being transferred during the telecommunications session between Pty 1 and Pty 2, the communications station identifies what sender metadata is associated with Pty1, determines the type of data in the data packet, and, if the data packet includes a RECORD (RCD) command, initiates the on demand command as requested by sender Pty 1 thereby turning ON or OFF the on demand record function at the communications station. Therefore, Pty 1, having the on demand record control token, is permitted to turn ON and OFF the recording function at the communication station during the entire telecommunications session. Pty 2, not having the RCD token, is not permitted to activate or deactivate the record function.

Further, in order to provide better on demand services, the comm station also monitors traffic and has a table which associates, with each party Pty1, Pty2, "transfer control" token commands. In other words, each party may be assigned an "on demand RCD control token" and a "transfer RCD control token" by the system. Command tokens and command transfer tokens are assigned by the system at the initiation of the comm session. In this manner, if Pty 1 wishes to reassign the record control token to Pty2 (the initial setting of the system denied Pty 2 the RCD command token), Pty1 initiates the appropriate transfer token command on the enabled device, and the communications system recognizes that transfer token command in the respective data packet from sender Pty1 and thereafter transfers the on demand record control to the other party Pty2.

The same process for on demand token controls is provided for indexing, bookmarking, translating, transcription and supplemental data insertion or storage with the recorded information.

BRIEF DESCRIPTION OF THE DRAWINGS

Further objects and advantages of the present invention can be found in the detailed description of the preferred embodiments when taken in conjunction with the accompanying drawings in which:

FIG. 4A diagrammatically illustrates graphs showing the relationship between increasing SLAs or service level applications applied to a particular telecommunications sessions based upon the degree of authenticated identity AU-ID of Pty 1 and Pty 2 (the greater the confirmed identity, the more on demand services available to the parties); and FIG. 4B diagrammatically illustrates a graphic relationship between the service level applied (SLA) to telecommunications sessions based upon a categorical assessment of the communications session (listed as examples the categories of pre contract negotiations, electronic signature contracts and depositions).

DETAILED DESCRIPTION OF THE PREFERRED EMBODIMENTS

The present invention relates to a method and a system for recording identity data to enable participants in a telecommunications session, Pty1 and Pty2, to request on demand services from a communications station. Many of these on demand services are related to recording sounds and voices captured by the telecommunications enabled devices which are used by the respective users in the telecommunications session. Therefore, once appropriate controls and log-in procedures are establish by the inventive system, one of the parties (Pty 1) may elect to record the conversation, thereafter transfer the recording control to the other party (Pty2), enabling the second party Pty 2 to turn ON and OFF the record RCD command. Further on demand services include transcription, translation, archiving the recorded conversation or sounds captured by the enabled devices, distribution of that recorded data, certification and authentication of the recorded data, supplementation of that recorded data, indexing, bookmarking, emotional coding of user and the association of the emotional data with the recorded data, (the emo track is the emotional data based upon an analysis of the speaker's voice), fact checking of the data, profiling, indexing of the data and supplementing the data with additional text and/or voice notes by participants.

Further details of functions of the on demand services and the operations of the communications system are provided in the patent application entitled "Certified Communications System and Method" Ser. No. 12/782,456, filed May 18, 2010 the contents of which is incorporated therein by reference thereto.

Functions, structures and modules which are similar to each other utilize the same reference numbers herein. An abbreviation table at the end of this patent specification provides additional explanations of abbreviations used herein.

Figure 1A:
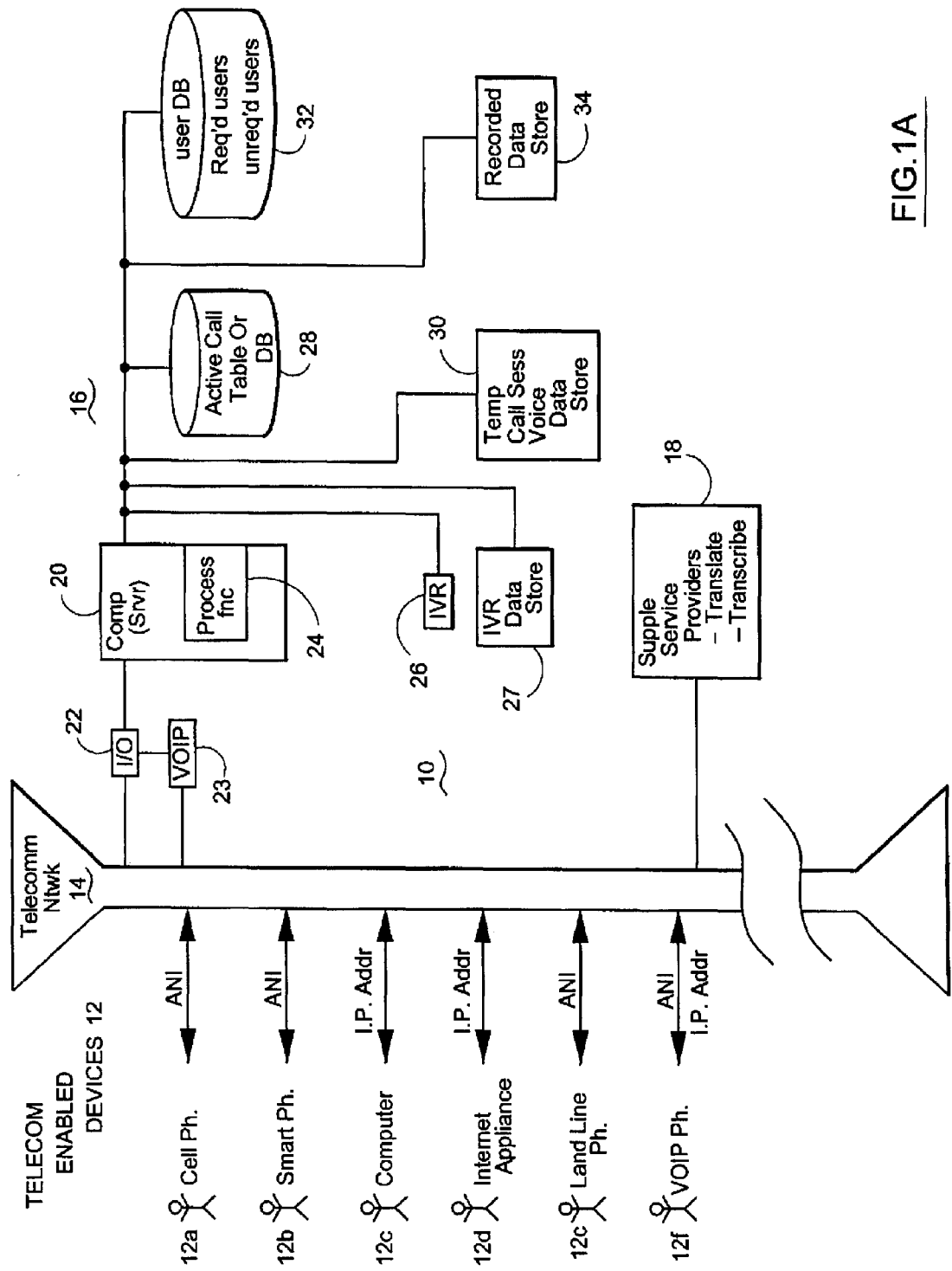
FIG. 1A diagrammatically illustrates the communications system, the telecomm enabled devices, the telecommunications network, and the communications station.

FIG. 1 diagrammatically illustrates a communications system 10 which includes telecomm enabled devices 12, and, more specifically, and enabled devices 12a-12f. These devices are communicatively coupled to a telecommunications network 14. A communications station 16 is also communicatively coupled to telecomm network 14. Further, supplemental service providers 18 are connected and coupled to the telecommunications network 14. Other configurations of the communications station 16 are discussed in the Certified Communications System patent disclosure which is incorporated herein by reference. For example, the Certified Communications System patent disclosure discusses both a centralized communications station as well as a decentralized or distributed station. This concept of distributed station utilizing storage facilities and remote processors, separate and apart from a cental communication station are incorporated herein.

Telecomm enabled devices 12 include, among other things, cell phone 12a which sends an automatic number identifier ANI and, under current regulation, an automatic location identification ALI the telecomm network. Smart phone 12b is operated by the icon selection also sends an ANI and ALI to the telecomm network. Computer 12c as well as internet appliance 12d, at a minimum, includes a keypad, which is either a mechanical keypad or a virtual keypad with displayed icons, a microphone and a speaker. The keypad, either mechanical or iconic, enables the user at computer 12c to select various commands and also to enter data as requested by communications station 16. Computer at 12c includes a microphone and a speaker in order to capture sounds at or near the computer as well as to announce information provided by the interactive voice response IVR module of the communications station 16. As for internet appliance 12d and voice over internet protocol VoIP phone 12f, it is preferable, but not required, that these enabled devices have a display for the display of information. Land line 12e provides ANI data to the telecomm network. The computers and the internet appliance provide an I.P. address to the telecomm network. It is known by person with ordinary skills in the art, that the automatic number identification or ANI is sometimes provided as a caller ID information stream CID or a caller line ID CLID. All this information is transmitted to and through telecommunications network 14 and, once communications station 16 is engaged in the telecommunications session, station 16 monitors all the data packets transmitted between the parties engaged in the telecomm session. The sender ID data in the data packet represents, to some degree, this identification data.

Multiple parties, rather than two parties Pty 1, Pty 2, may by on cell phones during the comm session therefore cell phone 12a is representative of a plurality of cell phone used by parties engaged in a telecommunications session. It should be noted that the present system and method also operates with a single party engaged in a solo telecommunications session. Although the discussion herein focuses on a two party telecommunications session, the functions for a two party session apply equally to a conference call with multiple parties. Further, these parties may utilized any of the telecomm devices as long as those devices include a microphone, a speaker and some type of mechanical keypad or iconic keypad enabling the user to select commands and input information to communications station 16.

Communications station 16 includes an input and output I/O device 22 as well as a voice over internet protocol VoIP device or module 23. VoIP module may be directly connected to the I/O unit 22 or may be independently connected to the telecomm network 14 as known by persons of ordinary skill in the art. The communications station 16 includes a computer processor 20 which is sometimes configured as a server. Computer 20 includes and activates processes and functions fnc 24 as discussed hereinafter. The computer 20 or processor 20 interacts with interactive voice response IVR module 26 and the IVR data store 27. The IVR module 26 converts voice information from one of the parties using enabled devices 12 into machine understandable data. Also, IVR 26, in combination with IVR data store 27, provides digital signals which convert into audible instructions at the telecomm enabled devices 12 associated with a particular participant. It should be note that the comm station elements may be rearranged and reconfigured for better processing, including combining of all memory units or data storage facilities into a single unit. IVR data store 27 may be combined with data memory stores 28, 30, 34 and 32. These items are separated primarily to explain their different functions in the comm station 10.

Communications station 16 also includes a user database DB 32 which stores information on registered users as well as unregistered users. Some unregistered users are only partly registered with the system. In other words, the user at cell phone 12*a* may have previously registered with the communications 16 and completed a full user profile. If the user at cell phone 12*a* is communicating in a telecommunications session with user 12*b* on a smart phone, and the called party 12*b* has not registered, in order to deploy the on demand services of the communications session 16, the user at smart phone 12*b* must complete some version of the summary profile S-profile and that summary profile is stored as an unregistered or a partly registered user profile in user data 32. Further discussion of the registration process is provided in the Certified Communications System patent disclosure.

Communications station 16 also includes an active call table or database 28 which effectively monitors each data packet transferred from the sender to a destination or receiver and the telecommunications network 14 when communications station 16 is part of that telecomm session. Communications station 16 may also include a temporary call or voice data store 30 which temporarily stores the audible data transmitted in most data packets during the telecomm session.

Figure 1B:
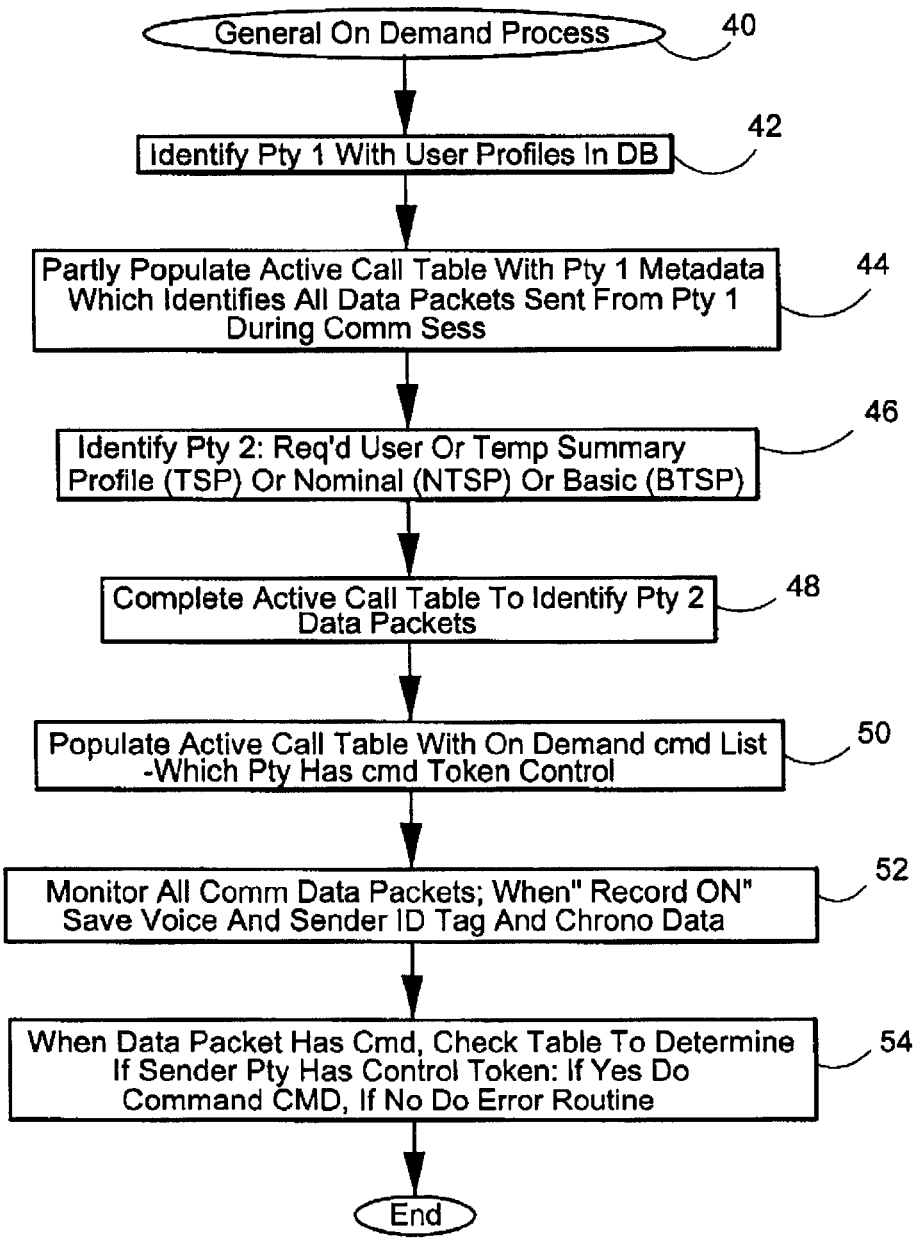
FIG. 1B diagrammatically illustrates the general process or flowchart for the on demand process.

FIG. 1B diagrammatically illustrates a general flowchart for the on demand process 40 in accordance with the principles of the present invention. In step or module 42, the communications station 16 identifies a calling party Pty1 with a user profile and database 32. If the calling party has not previously registered, some additional identifying or ID information is requested from the calling party Pty1 prior to activating the on demand services. This is discussed later in connection with FIGS. 2A-2C. Process 44 partly populates the active call table 28 with Pty1 sender metadata, the metadata particularly associated with the sender portion of each data packet form Pty 1. As is known by persons of ordinary skill in the art, these data packets transmitted by telecomm network 14 include fields for sender data, fields for destination or receiver data, fields for "data content" and may include a "type" field indicative of the type of data transferred in data packet. The "content data field" is the critical information transferred in a data packet. For example, if a data packet included a voice signal obtained from Pty 1 at cell phone 12*a*, the data packet would indicate and include sender metadata from sender 12*a*, destination or receiver metadata indicating smart 12*b*, and "content data" representing Pty 1's voice. A "type" field may also be included. Sometimes, these communications protocols are identified as UDP protocol or user data gram protocol and session initiation protocol SIP. Of course, the data packet may include other data fields. However, at a minimum, the data packet must include center data, receiver data, and "a content data field."

The UDP and SIP protocol is explained, in part, by the following quotation. "While a complete cycle of registration, call signaling, voice transmission, and teardown can use several TCP and UDP ports and connections with SIP or H.323, IAX handles all of these functions using a single UDP port. When the IAX client (end point) registers with the TAX server of proxy, this UDP port is utilized. When a call is placed, this same port is utilized. When voice transmission occurs, this port is utilized once again. The way IAX distinguishes between registration, signally, and voice packets is by including headers and metadata in each packet that defines what the packet's purpose is and whether it has a payload attached. The IAX protocol documentation describes the order of these header and metadata elements as control frames, metaframes, and information elements, each with an IAX-specific syntax. IAX isn't encoded using ASCII or ASN.1 either. Instead, it uses a purely a proprietary performance-oriented binary-encoding scheme. Unlike SIP and H.323, IAX is not a standards recommendation, but rather an independent protocol created by Mark Spencer, founder of Digium. Although proprietary, he specification for IAX is open and has been embraced by the VoIP community." In "Switching to VoIP" by Ted Wallingford, pg. 158, O'Reilly Media, Inc., 2005, available on Google Books, www.google.com.

Once the active call table 28 has been partly populated with Pty1 sender metadata, or obtained from the telecomm session information flowing from Pty1 and cell phone 12*a* to Pty2 and smart phone 12*b*, the comm station monitors and identifies that cell phone 12*a* sent the data packet. In step or module 46, the system identifies Pty 2 on smart phone 12*b* and ascertains whether the user or participant at smart phone 12*b* is a registered user or whether a temporary summary profile TSP or a nominal summary profile NTSP or a basic summary profile BSP should be opened and populated in user database 32.

As discussed later, the smallest profile of any user is a temporary summary profile TS profile when the user is typically a called party which has not previously been registered or acknowledged by station 16. Also typically, the TS profile is gathered during the session or as "intra-sessional" data. The next level up is a nominal temporary summary profile NTS profile which is utilized when the calling party Pty1 is unregistered but the calling party seeks to utilize the on demand services of station 16. This is also an intra-sessional data acquisition by station 16. The next level up in the profile data hierarchy is a basic temporary summary profile or BTS profile. BTS profile data is obtained during a post-telecomm session event, typically when the calling party Pty1 has not been fully previously registered by station 16. The next higher level is a "full profile" by registered users. However, the full profile may be supplemented by credit data, payment data and history of use data as well as group identification, enterprise identification. These ID elements permit the system to provide various levels of on demand commands and appropriate controls applied by group and enterprise. Partial credit card reporting, a full credit card reporting, a partial credit report summary field, a full credit report field, and a history of use with communications station 16 are all valuable profile data used by the system. In this manner, communications station 16 employs hierarchal techniques and algorithms to authenticate (AU-ID, see Certified Communications System patent disclosure) who is the user as cell phone 12a as compared with smart phone 12b. This authentication identification AUI-ID is described in great detail in the "Certified Communications Systems and Method."

Returning to FIG. 1B, in step or module 46, the system identifies the called party Pty2 to determine whether the called party Pty2 is a registered user or must complete a TS profile, must provide additional information to station 16 to complete a nominal or NTS profile or complete a basic BTS profile.

In step or module 48, communications station 16 completes the active call table to identify packets from Pty2 with the sender metadata during the communications session. In step 50, the systems populates the active call table with on demand commands listed in each of the user's profiles, that is, the profile for calling party Pty1 as authorized commands listed in the profile. The profile for called party Pty2 also has on demand commands listed in Pty2 profile. Some commands are turned OFF and others are turned ON. Some of these on demand commands are subject to system defaults. Other commands are subject to category selection or quality of authentication identification AU-ID. Further, the active called table is populated with command token controls. The command token control determines which party can activate the particular command and which party can transfer that command token to the other party (a transfer or TSFR token) during the telecommunications session. Step 52 monitors all data packages. When the command for record is ON, the system saves voice data and sender identification tag or metadata as well as chronologic date and time stamp data in the temporary call session data store 30. A temporary data store 30 may be employed for faster processing. Recorded data store 34 represents more permanent storage of recordings. Quick acquisition of data and data storage may be better provided by temporary data store 30 rather than long term archival data store 34. However, persons with ordinary skill in the art may be able to design a system wherein only one data store is utilized. Therefore, the labels temporary and permanent are employed in this patent specification only to improve understanding of the on demand nature of the processes herein.

In step 54, when a data packet has been located which has a command, the station 16 checks the on demand control tokens for the sender party in the active control table. If the active control table for the sender party has an identical control token to the requested command, the system executes the command. If the active control table does not have the command token for the requested command, the system generates and activates an error routine and does not provide the on demand services requested by the sender.

Figure 2:
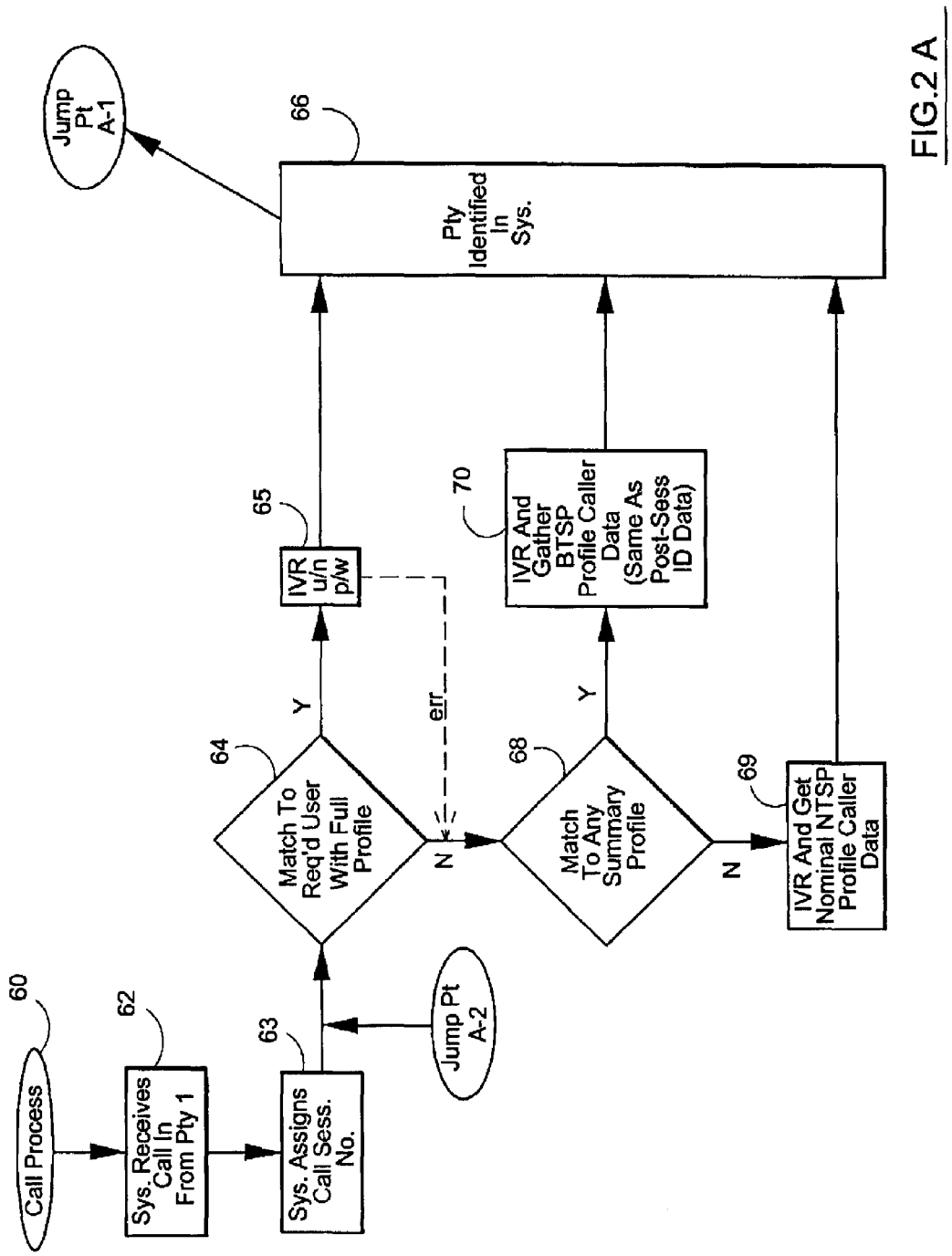
FIGS. 2A, B, C diagrammatically illustrate both an automatic and a manual intake procedure for a call in process (a telecomm session) as well as the utilization of the active call table.
Figure 2B:
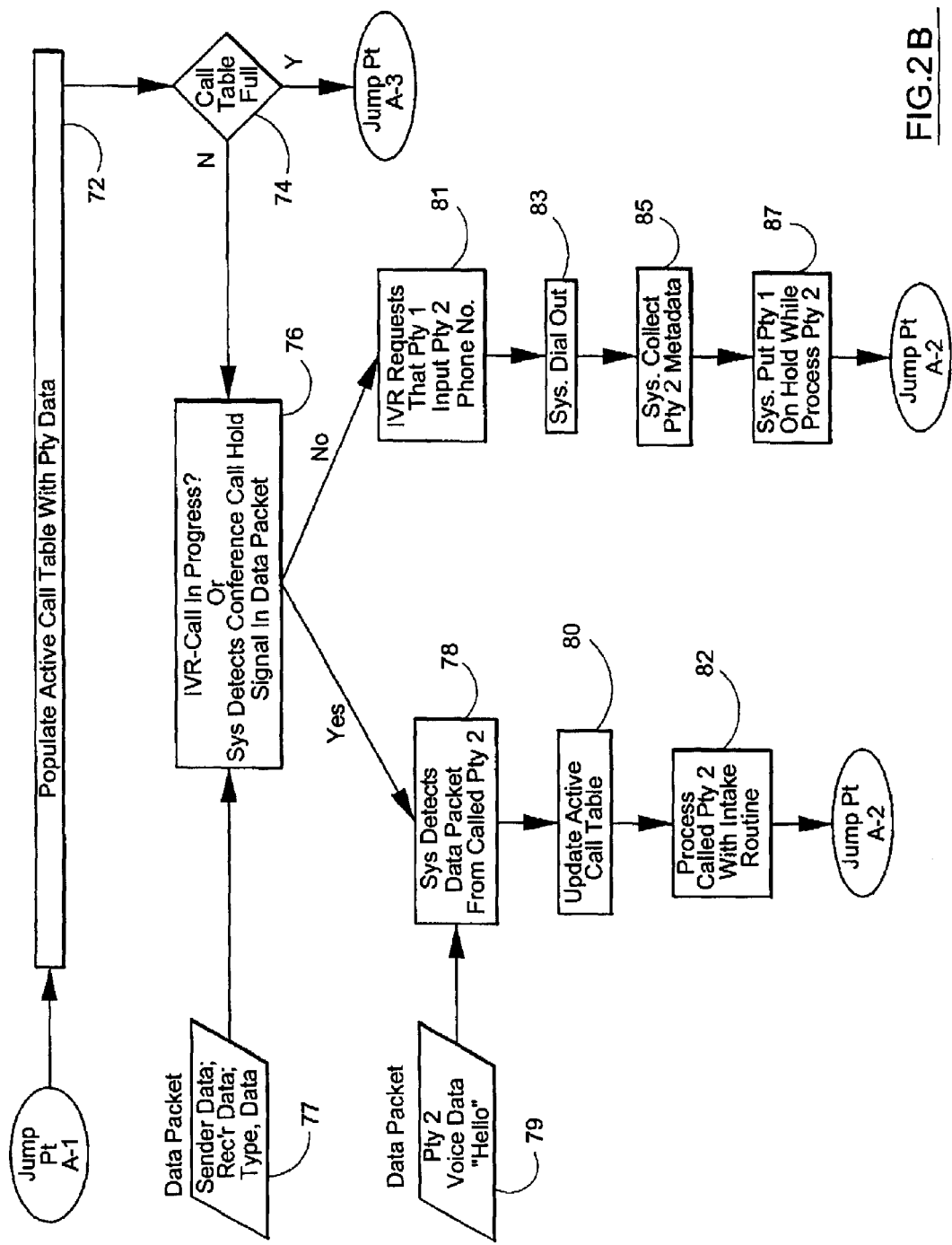
Figure 2C:
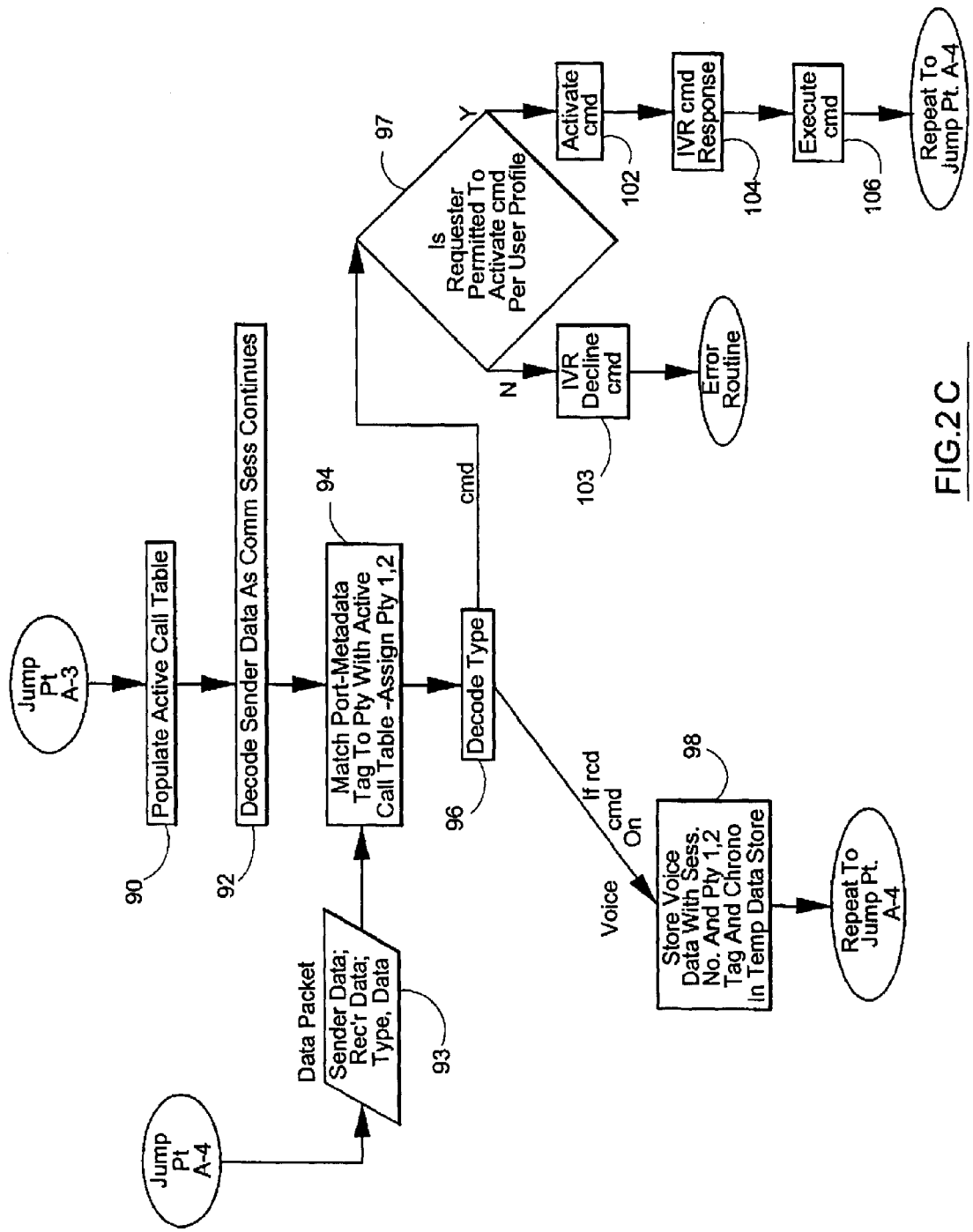

FIGS. 2A, 2B and 2C diagrammatically illustrate process flows and a general concept process for a call process. In call process 60, the system receives a call from Pty1 in step or module 62. In step 63, the system assigns a call session number to the call. As an example, the session number is identified in the active call table or database 28. The session number is used to collect all data relative to the telecomm session. Decision step 64 determines rather the metadata which accompanies the data packet identifies sender Pty1 which is listed in the user database 32. If a match is found, the system will further check the caller ID of Pty1 the caller line ID and any other data ascertainable from the data package or the caller. If a match with the registered user is found (YES), the system activates IVR step 65 which requires the party Pty1 to input username and password. If the username or password is not found in the registered users of user database 32, an error routine (err) is activated and the system resorts to the NO branch from decision 64. If a match with the username and password is found, the system recognizes in step 66 that the party is identified within the system and half of the active call table relative to Pty1 is complete with Pty 1 sender data. Returning to decision branch 64, if a match is not found with the registered user having a full profile, the NO branch is taken and decision step 68 determines whether there is a match to any user summary profile S-profile within the system. If YES, the system initiates via interactive voice step 70 which obtains basic temporary summary BTS profile data. This BTS profile data is the same as the post-sessional identification data obtained at nearly the end of the telecomm session.

After the system gathers the BTS profile data, the system then completes the active call log or at least part of the active call table in step 66. If no match is found in the user database for any summary profile from decision step 68, the NO branch is taken. In step 69, the system initiates interactive voice response and obtains nominal temporary profile data or NTS profile data. The system then partly populates the active call database or table 28 in step 66.

The following three tables illustrate the various initial identity capture routines.

The following Profile Identity Table—Initial Identity Capture for Unregistered Pty2 shows the most limited data acquisition for any participating party. In this case, the called party Pty2 has never participated in an on demand comm session. Little is known of Pty 2 except his ANI, maybe his CID, his CLID and his I.P. address.

| Profile Identity Table - Initial Identity Capture - Unregistered Pty 2 (example) | |
|---|---|
| Registered User | Temp Summary Profile (TS-Profile) for Called Pty 2 |
| name | unknown (unk) |
| name 2 (optional) | (unkn) |
| address | (unk) |
| phone 1 | (unk) |
| phone 2 | (unk) |
| current, active phone (ANI) confirmed YES | current phone (ANI), if in use confirm YES/NO; permit Certified call only if YES |
| current I.P. address | current I.P. address, if in use |
| I.P. address | (unk) |
| email | (unk) |
| Cert Call history | new |
| date 1 - sess no. | 0 |
| date 2 - sess no. | 0 |
| Current Cert Session no. a1 date 3 - 2011 Feb. 06 | Current Cert Session no. a1 date 1 - 2011 Feb. 06 |

The following Profile Identity Table—Initial Identity Capture for Unregistered Calling Party 1 shows the NTS profile or nominal temporary summary profile discussed in connection with functional module 69. More ID information is known since the user has previous experience with the comm system.

| Profile Identity Table - Initial Identity Capture - Unregistered Calling Pty 1 (example) | |
|---|---|
| Registered User | Nominal Temp. Summary Profile (NTS-Profile) |
| name | phonetic IVR translation of Calling Pty 2 |
| name 2 | name voice print, used as a comparative match |
| for future | |
| address | (unk) |
| phone 1 | (unk) |
| phone 2 | (unk) |
| current, active phone (ANI) | current cell phone (ANI) |
| confirmed YES | confirm YES/NO; permit Certified call only if |
| YES | |
| current I.P. address | current I.P. address, if in use |
| I.P. address | (unk) |
| email | (unk) |
| Cert Call history | new |
| date 1 - sess no. | 0 |
| date 2 - sess no. | 0 |
| Current Cert Session no. a1 | Current Cert Session no. a1 |
| date 3 - 2011 Feb. 06 | date 1 - 2011 Feb. 06 |

The following table entitled Profile Identity Table—Post Session and Post Data Retrieval shows a basic summary profile BTS profile discussed above in connection with functional block 70.

| Profile Identity Table - Post-Session and Post Data Retrieval (example) | |
|---|---|
| Registered User | Basic Summary Profile (BS-Profile) |
| name | name provided by Pty 2 during retrieve data event |
| name 2 | voice print, may be used as a match in the future |
| address | (unk) |
| phone 1 | phone used at comm sess, confirm use by Pty 2 |
| confirmed YES | 0 |
| phone 2 | (unk) |
| last used active phone (ANI) | last used phone (ANI), if used |
| last used I.P. address | last used I.P. address, if used |
| I.P. address | I.P. address used at comm sess, confirm use by Pty 2 |
| email | email, provided by Pty 2 during retrieve data event |
| Cert Call history | Cert Call history |
| date 1 - sess no. | date 3 - 2011 Feb. 06 |
| date 2 - sess no. | 0 |
| date 3 - 2011 Feb. 06 | 0 |
| Current Cert Session no. 0 | Current Cert Session no. 0 |
| n/a | n/a |

With respect to the profile identity table for unregistered Pty 2, the system has captured the current ANI and possible the caller ID and caller line ID for the party calling into the communications station. The field "confirmed YES" is an acknowledgment ACK field. If the unregistered called party Pty2 does not affirm that the communications system can participate in the telecomm session, then the communications station 16 cancels its participation in the session. Otherwise, the unregistered Pty 2 acknowledges YES that communication station 16 can participate in the telecomm session and this acknowledgment is posted in the unregistered user portion of the user database 32. The TS profile will also capture the IP address if the user is employing computer 12c, internet appliance 12d or VoIP phone 12f. In order to correlate the active call table 28 with the user database 32, a marker or tag for the current session ID "a1" is posted in the user database 32. The date is also posted. The Profile Identity Table for Unregistered Pty2 shows and compares the registered user in the left column with the data in the TS profile on the right column for the unregistered Pty2. The registered user has earlier input data into user database 32, including his or her name, address, first and second telephones. The user profile also includes the current "active" line field. The "active line" identifies the enabled device in the comm session. This active device may be different that registered devices in the user database 32. This current active line field should match the data in "phone 1" or "phone 2" data fields. The IP address previously stored by the registered user, the current IP address, the registered user email and the certified call history is also enrolled or profiled. The certified call history could include a date and a call session number, For the unregistered Pty, a "0" notes a null field.

With respect to the Profile Identity Table—Initial Identity Capture Unregistered: Pty table above, the NTS profile has obtained a phonetic translation from the interactive voice response of Pty2 in step 69. The "name 2" field is a stored voice print of the name of the Pty engaged in the completion of a summary profile. The Pty data field for the current ANI of the cell phone, and the acknowledgment field and the current address is loaded in the partly completed profile.

With the Profile Identity Table—Post Session and Post Data Retrieval the system completes a basic summary or BST profile. The basic summary profile (BTS profile) includes the correct name of the party obtained during a previous data acquisition event. Since the basic summary profile is obtained in step 70 which indicates that some match between the summary profile in the user database 32 and the party calling in, the system has a phone number which was used at a previous session and a phone number that is now used in the current telecomm session. The last ANI for the last phone number and the last IP address is also enrolled and profiled. A confirmation occurs between this "last used" data and the current ID data obtained by the communications station. A match potentially increases on demand commands assigned to the partly registered user. The caller history of the Pty2 is loaded into his or her summary profile.

FIG. 2B is joined to FIG. 2A by jump point A-1. In step 72, the communications station 16 populates that active call table with the party data. Decision step 74 determines whether the call table is full (with all sender and receiver metadata) with respect to IDs for Pty1, that is, the person who initiated the call into comm station 16 and the second party Pty2 or the called party. The following table is a small segment of the active call table. The control command tokens are discussed later.

| Active Call Table - Short Version (example) | | |
|---|---|---|
| Field | Pty 1 | Pty2 |
| Call Session No. | 1a2b | 1a2b (after enrollment by Pty 2) |
| Port-Metadata | ABC | XYZ (upon receipt of first data packet) |
| CID/CLID | nnn | kkk |
| User Status | reg'd | NTS reg'd |
| Match Reg'd Phone | Y | n/a |
| Phone No Called | kkk | n/a |
| Control Token Rcd Status: | | |

-continued

Active Call Table - Short Version (example)

| Field | Pty 1 | Pty 2 |
|---|---|---|
| Control Token Tsfr Rcd Status: | | |
| Other On Demand Cntrls | | |
| Token Index | | |
| Control Token Tsfr Index | | |
| Token Supple | | |
| Token Tsfr Supple | | |
| Token Transcr. | | |
| Token Tsfr Transcr. | | |
| Token Translt. | | |
| Token Tsfr Translt. | | |
| Token Playback Last Recorded Data | | |
| Token Tsfr Last Recd'd Data | | |
| Token Playback Historic Rec'd Data | | |
| Token Tsfr Historic Recd'd Data | | |
| Token Bookmark | | |
| Token Tsfr Bookmark | | |
| Token Distribute | | |
| Toekn Tsfr Distribute | | |

If the call table is not complete with respect to both ID data for each of the participants, the NO branch is taken from decision step 74. In step 76, the system makes a determination whether the call is in progress and initiates an interactive voice response to the participant. Otherwise, the system detects a "conference call signal" or a "hold" signal in the data packet. The data packet 77 includes sender data, receiver or destination data, a "data type" field and a "data content field." This data packet is received by the communications station 16 and the system process detects the "call on hold" command or the user's audio response to the computer generated inquiry "is this call in progress?" If YES, the system executes step 78 wherein the system detects a data packet from call party Pty2. Data packet 79 from call party Pty2 may be voice content data indicating participation in the telecomm session such as a voice saying "hello." Step 80 updates the active call table. Step 82 processes the called party Pty2 with an intake routine which is further discussed in FIG. 2A by jump point A-2. In other words, the "first pass" through the call process 60 in FIG. 2A operates on the caller party or Pty1 therefore, the system must first determine whether the calling party is registered with the system in some manner or is not registered at all. Decision step 74 determines whether the call table is full indicating whether both parties to the telecomm session are, to some degree, logged into user database 32 as either a completely registered user or as a partly registered user sometimes called an "unregistered user" herein. Step 76 initiates an IVR process with the participants on the call and particularly in the "first pass" of call process 60 this IVR relates to the calling party Pty1. The calling party either affirms that the call is in progress or strikes a command cmd "on hold-conference" command data button or icon on his or her enabled device 12 and the corn system 16 recognizes that "hold" signal. The YES branch from function block 76 indicates that a second party Pty2 will join the telecomm session and step 82 recycles the second party into the "match caller to user record" process shown in FIG. 2A. This is the "second pass" through the call process. Therefore, the called party Pty2 is processed through decision step 64 and 68, if necessary, and ultimately is identified in step 66. In either case, if Pty2 is completely registered, decision step 64 triggers the YES branch. If Pty2 has had some interaction with the certified call system, decision step 68 triggers the YES branch. Step 70 adds additional ID information to the partly registered user Pty2. If the called party Pty2 has never been involved in the called system at an earlier, step 69 gathers nominal temporary summary NTS profile data and partly registers the user in user database 32.

Returning to step 76, if the party on the line indicates that the call is not in progress or the system detects a "on hold" or "conference call" command from that party, the NO is branch is taken and the system executes step 81. Step 81 requests from the calling party that the calling party input the called party Pty2 telephone number. The system, in step 83, dials out to Pty2 phone number. The system in step 85 collects the metadata from the data packet of Pty2 and ANI and CID and CILD data. This metadata of the sender Pty2 is logged into the active call table and the ANI and ALI and CID and CLID and I.P. address, if available, is logged into the database 32. Also, the dialed Pty2 telephone number is logged in. The system, in step 87 puts Pty1 on hold while the system processes Pty2 as shown in initial process FIG. 2A.

FIG. 3C is activated from the YES branch of decision step 74 indicating that the call table is full (see FIG. 2B). Jump point A-3 joins FIG. 2B to FIG. 2C. Step 90 in FIG. 2C again populates the active call table. Step 92 decodes sender data as the telecomm session continues. Step 94 indicates that the communications station 16 matches the port or metadata sender tag to the party listed in the active call table. The active table can quickly ID the sender of data packet 93 as Pty1 or Pty2. Step 96 notes that the system, in some data protocol instances, decodes the "data type" field of the data packet. As stated earlier, the communications protocol for various data packets on telecomm network 14 change.

The following Active Called Table—Database with Status and Time Condition shows one potential structure of the active call table. Persons with ordinary skill in the art may use different tables and data structures, indexes or databases.

Active Call Table - Database with Status and Time Conditions (example)

| Field | Pty 1 | Pty 2 |
|---|---|---|
| Call Session No. | 1a2b | 1a2b (after enrollment by Pty 2) |
| Port-Metadata | ABC | XYZ (upon receipt of first data packet) |
| CID/CLID | nnn | kkk |
| User Status | reg'd | NTS reg'd |
| Match Reg'd Phone | Y | N |
| Phone No Called | kkk | n/a |
| Control Token Rcd Status: | | |
| Record Token (at t1) | Pty1 (at t1) | n/a (at t1) |
| Record CMD ON (t2) | Y | n/a |
| Record CMD OFF (t3) | N | n/a |
| Record CMD ON (t4) | Y | n/a |
| Record CMD OFF (t5) | N | n/a |
| Control Token Tsfr Rcd Status: | | |
| Transfer Rcd Cntrl Token | Y | Y Note: both Parties can accept Cntrl transfer |
| Control Token Tsfr Rcd CMD sent at t6 | | |
| Tsfr Rcd Cntrl Token (t6) | Y (at t6) | Y (at t1 plus sys time) |
| Control Token Rcd Status: | | |
| Record Token (at t7) | n/a (at t7) | Pty2 (at t7) |
| Record CMD ON (t8) | n/a | Y |
| Record CMD OFF (t9) | n/a | N |
| Record CMD ON (t10) | n/a | Y |
| Record CMD OFF (t11) | n/a | N |
| Token Index Status: | | |
| Index ON-OFF CMD | ? | n/a |
| Control Token Tsfr Index | | |

-continued

Active Call Table - Database with Status
and Time Conditions (example)

| Field | Pty 1 | Pty2 |
|---|---|---|
| Tsfr Index Cntrl Token | Y | N Note: Pty 1 permitted; Pty 2 not permitted Control |
| Token Supple Status: | | |
| Supple ON-OFF CMD | ? | ? Note: indeterminate due to control state |
| Control Token Tsfr Supple | | |
| Tsfr Supple Cntrl Token | Y | Y Note: Pty 1 and Pty 2 permitted |
| Control Token Transcr. Status: | | |
| Transcr. ON-OFF CMD | N | N |
| Control Token Tsfr Transcr. | | |
| Tsfr Transcr. Cntrl Token | N | N Note: no party permitted to transcribe |
| Control Token Transit. Status: | | |
| Transit. ON-OFF CMD | N | N Note: no party permitted to translate |
| Control Token Tsfr Translt. | | |
| Tsfr Transit. Cntrl Token | N | N |

The active call table identified above shows not only basic fields but also status at time states t1 through t11. The Table changes over these time frames t1 to t11. Focusing on the status and time changes, it is shown that the "Record cmd ON" event occurs at time t2 for Pty1. The table shows Y at t2 indicating that the Record RCD cmd is turned ON by Pty1. At that same time t2, Pty2 field in the active call table is shown n/a or not available because the RCD CMD control token is assigned to Pty1, not to Pty 2, as noted by the entry at time t1. In the present embodiment of the invention, a control token is assigned to one of the parties for each of the on demand controls or commands. Particularly, the record command RCD CMD can only be operated by one party at a time. The token control is sometimes referred as a baton control in various other patent specifications. Therefore, the active call table set forth above shows the status and the time condition of the record ON command at times t2 (RECORDING ON), time t3 RECORD OFF, at time t4 RECORD ON and at time t5 RECORD OFF. Further, in order to determine whether the control token RCD CMD or the control token record baton can be transferred from one party Pty1 to another party Pty2, there is a field in the active call table for a control token transfer (TSFR) status. In other words, each "on demand" control has a status field and a transfer TSFR field. In the illustration above, the active call table for Pty1 and Pty2 shows that the record token can be transferred from Pty1 to Pty2. The note "both parties can accept control transfer" is found in the active call table above. Sometimes, Pty 2 is not permitted to transfer due to his "poor" profile and this "no transfer" marker is in the Active Call Table. The transfer command is noted in the active call table at time t6. The control table notes at time t6, Pty1 transfers the RCD token to Pty 2 at time "t6 plus system time." See YES for Pty2. At time t7, the active call table shows that the RCD cmd token is in the hands Pty2. At time t8, t9, t10 and t11, the record ON and record OFF command is activated by Pty2 to turn ON, OFF and ON and OFF the record on demand function. The other additional commands are also shown in the active call table listed above. These other commands include a token index cmd, token transfer index, token supplemental item, token transfer supplemental item, transcription status and transcription transfer, a translation status and a translation transfer.

The additional functions which are available on demand are discussed in Certified Communications System patent disclosure. These other on demand features include playback of earlier recorded data (historic data) as well as intra-sessional playback of previously recorded data for the current telecomm session.

The following table provides an example of commands and transfer token commands and one proposed embodiment of the active call table.

Example of Token Commands and Transfer
Token Commands in Active Call Table

| Field | Pty 1 | Pty2 |
|---|---|---|
| Control Token Record (Rcd) Status: | | |
| Record Token (at t1) | Pty1 (at t1) | n/a (at t1) |
| Note: see Rcd Token Status field shows Rcd ON-OFF status under Pty 1 command (CMD) | | |
| Control Token Transfer (Tsfr) Rcd Status: | | |
| Transfer Rcd Control (Cntrl) Token (at t1) | Y | Y Note: Pty 1, 2 same |
| Note: When both Tsfr Rcd Cntrl Token fields for Pty 1, 2 YES, then transfer permitted | | |
| Token Index Status: | | |
| Index Token ON-OFF CMD | ? | n/a Note: cmd dependent |
| Control Token Tsfr Index | | |
| Tsfr Index Cntrl Token | Y | N Note: Pty 1 yes, Pty 2 no |
| Note: Pty 2 cannot accept Tsfr Index Cntrl Token and can never activate Index cmd. | | |
| Token Supple Status: | | |
| Supple ON-OFF CMD | ? | ? Note: indeterminate |
| Control Token Tsfr Supple | | |
| Tsfr Supple Cntrl Token | Y | Y Note: Pty 1, 2 same |
| Control Token Transcr. Status: | | |
| Transcr. ON-OFF CMD | N | N Note: Pty 1, 2 no |
| Note: no Pty permitted to Supple recording per the Pty profiles | | |
| Control Token Tsfr Transcr. | | |
| Tsfr Transcr. Cntrl Token | N | N Note: none permitted |
| Control Token Translt. Status: | | |
| Translt. ON-OFF CMD | N | N Note: none permitted |
| Control Token Tsfr Translt. | | |
| Tsfr Translt. Cntrl Token | N | N |

As noted above, in the token command and transfer token table, the active call table includes RCD cmd and token transfer RCD fields, token index cmd and token transfer index fields, supplemental cmd fields and supplemental TSFR token fields, token transcription cmd fields and token transfer transcription fields, and token translation cmd fields and token transfer translation fields. Additional fields such as historic playback from pre-recorded data from recorded data store 34 (FIG. 1A) and previously recorded data from voice data store 30 for the current telecomm session may be added to these token commands and transfer token commands.

Returning to FIG. 2C in step 96, the system detects whether the data content in data package 93 is voice or is a command. If voice, and if the RCD cmd is ON, the system in step 98 records the voice with the session number and identifies which party Pty1 or Pty2 has sent the data packet 93 with the voice content field. The voice data stored in voice data store 30 in addition to the session number, the sending party metadata or an ID of that data per the Active Call Table and chronologic (date-time stamp) data. The system then jumps to A-4 and cycles back to receive other data packets as part of the monitored telecomm session.

Returning to decode type step 96, if a command cmd is noted by the communications station 16, the system then enters decision step 97 which is a decision to ascertain whether the requester (Pty1 or Pty2) is permitted to activate the command cmd as provided in the user profile. Since the active call table has both control token cmd status fields and control token transfer status fields for each of the on demand services provided by communications station 16, the station can quickly ascertain whether the requesting party (Pty1 or Pty2) is permitted to activate the command. For example, if Pty2 does not have the RCD cmd token in his active call table, Pty2 cannot turn RCD ON and cannot turn RCD OFF. In this case, the NO branch is taken and the system in step 103 indicates, preferably by IVR, but alternatively by display or other data return, indicates that the system will not execute the requested command. An error routine is then activated. If the requesting party Pty1, Pty2 is permitted to activate the requested cmd in data packet 93, the system takes the YES branch and activates the command in step 102. In step 104 preferably an IVR is delivered to the requesting party indicating that the request has been received. Alternatively, the display on the enabled device 12 is indicated. Step 106 activates the command and the system then jumps to jump point 84 which again circulates the data packet 93 through the system until otherwise indicated as by an end of session (EOS) command. The end of session command is discussed in Certified Communications System patent disclosure.

Figure 3:
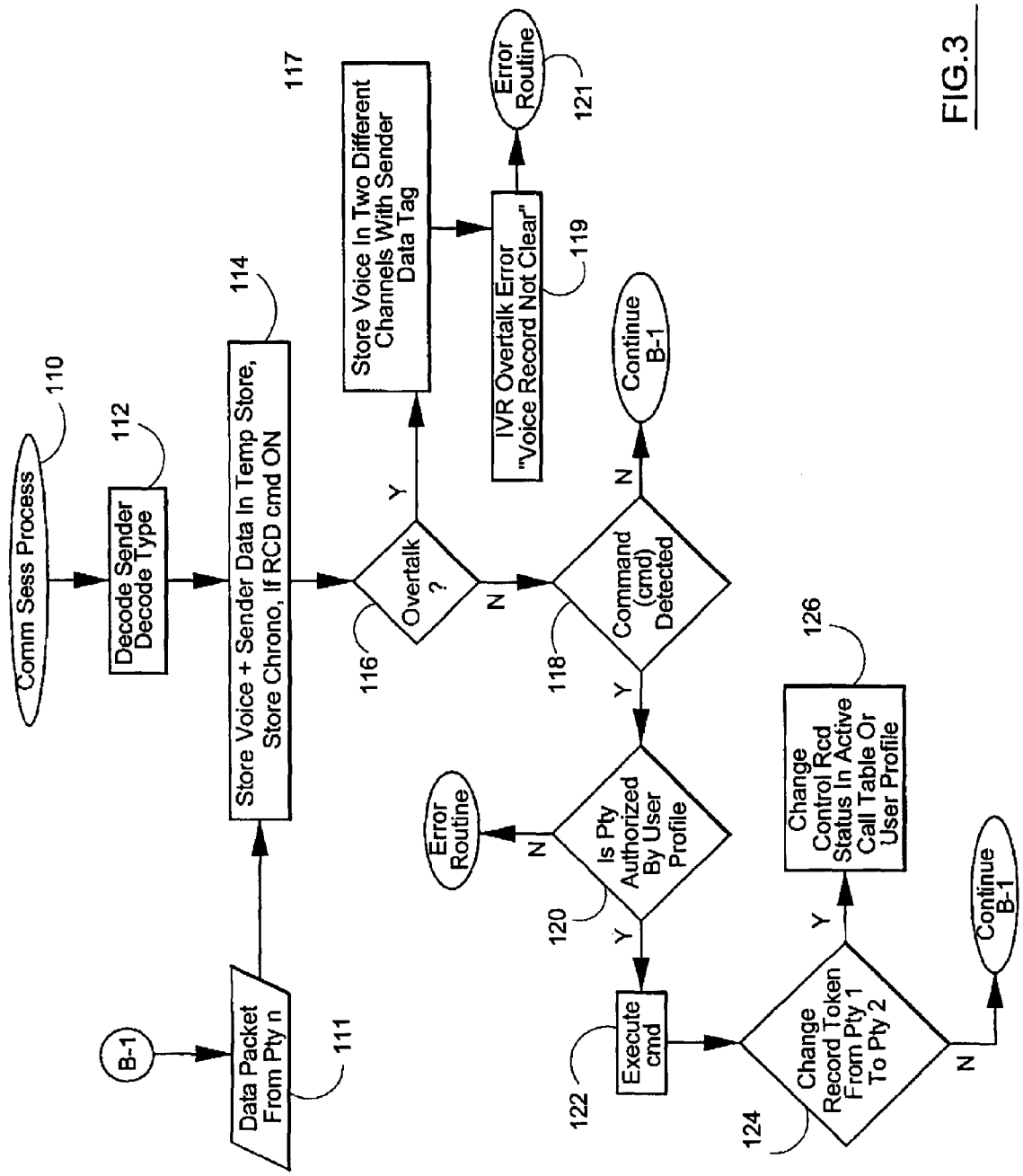
FIG. 3 diagrammatically illustrates a communications sessions process and, more particularly, a talk over system error routine as well as a command transfer routine.

FIG. 3 diagrammatically illustrates a communications session process 110 that includes an over talk error routine as well as the exchange of the command tokens or the transfer of the command tokens from one party to another. In step 112, the system decodes the sender information and the "data type" from data packet 111 sent from party n. Of course, party n refers to Pty1 or Pty2 whomever sent the data packet 111. Step 114 stores the voice record and the sender data in the temporary store and stores chronologic data if the RCD cmd is turned ON. Decision step 116 determines whether communications station 16 has obtained two data packets which overlap in chronologic time for voice content. If YES, the system in step 117 stores the two voice content data packets in two different channels in temporary storage 30 along with the sender tag data for each of the voice content packets. The system in step 119 provides an IVR indicating the over talk error and indicating that the voice record is not clear. The system then executes error routine 121 as necessary. If an over talk condition has not been detected in decision step 116, the NO branch is taken and in decision step 118, a determination is made whether command cmd data type is detected. If NO, the system jumps to jump point B1 which is acceptance of data packet 111. If YES, the system executes decision step 120 wherein a determination is made whether the requesting Pty is authorized by his or her user profile to execute the command.

The user profile from user database 32 is used to populate the active control table 28 and load up the permitted commands and permitted control cmds as well as control token transfer fields. If cmd is authorized, the decision from step 120 is YES and the system in step 122 executes the on demand command for services. In step 124, the system determines whether the transfer token has been part of the command and if NO, the system continues to jump point B1 and processing packet 111. If the transfer token command has been recognized, the YES branch is taken and in step 126, the system changes the control RCD cmd from one party to another in the active call table. After step 126, the system jumps to point immediately accepting data packet 111. The use of an Active Call Table and the passing of cmd tokens enables the system to process multiple party on demand conferences.

It should be noted that the present system can have various system set defaults based upon the amount of ID information provided by each party Pty1, Pty2 as they enter and log data into the system. In general, the more AU-ID data in the system that is used to identify and confirm the identity of a particular caller, the greater amount of service and, particularly on demand services, can be provided to that particular caller. The caller is permitted to use increasingly more complex and more expensive service levels (SLAs) dependent upon his or her profile data. The profiles have the permitted commands therein.

In FIG. 4A, a graphic chart shows authenticated identity data AU-ID as compared with service level available (SLA) to the users. On the horizontal axis, the lowest amount of data permitted and acquired on a user is the temporary summary or TS profile. Again, the TS profile data includes just the ANI for the current phone or enabled device 12 and possibly geographic location data ALI. This is true if a telephone is used or an original appliance or computer. The user associated with a temporary summary profile is permitted the lowest level of service. The following table shows Service Level Applied examples.

| Service Level Applied (SLA) Table (Example) |
| --- |
| SLA 1.0: basic, nominal level: Recording by one party, single party line |
| SLA 1.1: Two Pty 1, 2, recording permitted by Rcd cmd token at only Pty 1 |
| Pty 1 fully reg'd user; Pty 2 either TS or NTS Profiled |
| SLA 1.2: Two Pty 1, 2, recording permitted by both, Rcd cmd token passed Pty 1, 2 |
| Pty 1 fully reg'd user; Pty 2 BTS Profiled |
| SLA 2: Two Pty 1, 2, recording OK by both, Rcd cmd token passed Pty 1, 2 + Index OK |
| Pty 1 fully reg'd user; Pty 2 fully reg'd user |
| SLA 3: Two Pty 1, 2, rcd OK by both, Index OK by both; access to archive OK Pty 1, 2Pty |
| 1 fully reg'd user with basic credit history; Pty 2 fully reg'd user |
| SLA 4: Add on transcription (profiles require full credit rpt history) |
| SLA 5: Add on distribution (profiles require clearance from group or enterprise) |
| SLA 6: Add on certification (profiles require access control and AU - ID clearance) |
| SLA 7: Add on fact checking (profiles require credit and group clearance) |
| SLA 8: Add on profiling by one or both parties (profiles require each Pty approval) |
| SLA 9: Add on emotional coding (profiles require each Pty approval and group OK) |

In the Service Level Applied Table listed above, some very basic examples of the service levels are indicated. SLA level 1.0 permits only solo recording by only one party Pty1. For example, an artist may want to record his or her newly created song. SLA 1.1 is a two party telecomm system Pty1, Pty2. SLA 1.1 indicates a two party conversation subject to recording by only Pty1. Only Pty1 has the RCD command token in the active call table. SLA 1.2 permits the Record command token to be passed between Pty1 and Pty2. Pty2 has a basic temporary summary BTS profile at log in. The other service levels from SLA 2 through SLA 9 show that, based upon greater amount of authentication identity data AU-ID as well as credit report, third party AU checks, history, and group and enterprise clearances, additional service levels are provided. As an example of SLA 5, distribution may be permitted only within a registered police department when a policeman logs in and records information. The police department is the "group" or "enterprise." Of course the group or enterprise may have sub-groups and SLA 5 encompasses that concept. Since fact checking, transcription and translation are expensive on demand events, the user profiles must include history of use or sufficient financial ability to pay for such events. Emotional coding is highly suspect and may require approval on a group level or enterprise level as well as individual party approval Pty1, Pty2 who log into the system. In this sense, there is an hierarchal relationship between the amount of data acquired by the communications station 16 and the amount of on demand service level provided by the communications station.

FIG. 4B shows that the services level changes based upon the category of telecomm session. An individual may only be permitted a lower service level SLA 1. If the participant elects "a pre-contract negotiation" classification during an initial setting of the telecomm session, this category may be limited to SLA 2. A higher SLA is needed for E-sign events to comply with E-SIGN laws and regulations, See SLA 3. For example, the services level 3 as shown in FIG. 4B should include acknowledgment ACK by all parties that an electronic signature event is occurring, that each party has access to the recorded material and that each party acknowledges ACK that the event is being recorded and they intend to be bound by the electronically signed contract. Another higher level of service is needed when the parties engage in a deposition with multiple parties. One of the parties would be a court reporter, another party would be the attorney asking questions of the deponent and a third party would be the person answering the questions or the deponent.

In the drawings, and sometimes in the specification, reference is made to certain abbreviations. The following Abbreviations Table provides a correspondence between the abbreviations and the item or feature.

Abbreviations Table

| | |
|---|---|
| ACK | acknowledge, for example a user acknowledges that a telecomm session may be recorded |
| addr | address as in IP address or mailing address or billing address |
| admin | Administrator |
| alt | alternative process |
| ALI | Automatic Location Identification. |
| ANI | Automatic Number Identification |
| arch | archive, such as secure back-up archive data storage |
| ASP | application service provider—server on a network |
| AU | authenticate |
| AV | audio-visual content includes all shared data, voice, audio, docs, images, video |
| bd | board |
| cert | certification or certifiable |
| CD-RW | compact disk drive with read/write feature for CD disk |
| ch | channel |
| ck | check or confirm |
| CID | caller ID |
| CLID | caller line ID |
| comm | communication event or telecommunications system (where noted) |
| comm ch | communications channel, ans, caller Id, IP address |
| comm cnt | communications content, from 1 pty, 2 pty, group, may be audio, AV, any digital content exchanged or transferred to or through sys |
| comm device | cell phones, PDAs, computers, see Table |

Abbreviations Table -continued

| | |
|---|---|
| comm sess | a communications session causing a log, a record and content save |
| comm pty | any party to a comm session, a caller or a called party, etc. |
| cnt | content, such as audio content recorded |
| Cntr | Center, such as a Control Center (Cntlr Cntr) |
| cntrl | control |
| CPU | central processing unit |
| cr cd | credit card |
| cr rpt | credit report |
| DB or db | data base |
| defn | defined, such as user defined parameter |
| disp | display, sometimes displ |
| distrib | distribution |
| doc | document |
| dr | drive, e.g., computer hard drive |
| DS | data storage |
| EMO | emotional analysis or rpt on telecomm ses |
| encry | encryption |
| equip | equipment |
| E-Sign | electronic signature compliant |
| ex | example |
| extr | extrinsic or data outside the cert sys |
| fnc | function, e.g., record function |
| geo | geographic location or code |
| gov | government law, regulation or protocol, e.g. HIPPA regulation |
| GPS | global positional system, typically GPS data |
| grp | group, such as a user's group or organization |
| hist profile | historic use data in user's profile |
| ID | identity |
| I/O | input/output |
| I-com | Internet storage |
| Int | Internet communication system |
| intr | Intrinsic or within the cert sys |
| IVR | interactive voice response (human to and from computer) |
| kypd | keypad |
| loc | location |
| log | a log of a rcd session, chronologic date-time stamp |
| mbr | member registered in system |
| mem | memory |
| mess | message as in SMS or text message |
| mic | microphone |
| mgt | management |
| n/a | not applicable |
| no. | number, as in phone number |
| ntwk | network |
| obj | object, for example, a data object |
| ofc. | office |
| opt | optional |
| ph | phone as in phone number |
| pgm | program |
| profile | all data about a member in system |
| Pty | party, such as caller party or called party |
| p/w | password |
| rcd | database record or recorded audio content or AV content |
| rcd'd | recording on |
| rec'r | receiver data or destination data in data packet |
| re | regarding or relating to |
| reg | registered as in Reg User or Reg Member (mbr), sometimes reg'd |
| rel | release |
| reqmt | requirement or protocol, may be optional |
| rqst | request |
| rev | review |
| rpt | report |
| rt | real time or within a reasonable, somewhat predictable time after the event |
| sch | search |
| scrn | screen, as in touch screen computer enabled device |
| sec | security |
| seg | segment |
| sel | select |
| serv | service, as in transcription service |
| sess | telecomm secession, audio, AV, Internet |
| S profile | summary or short form user profile |
| SL | security level (sometimes S1 for security level 1, etc.) |
| SMI | system management interface |
| spkr | speaker |

Abbreviations Table (continued)

| | |
|---|---|
| srvr | server |
| std | standard |
| sys | system |
| t | time, usually time period |
| telecomm | telecommunications system or network |
| temp | temporary |
| transcr | transcription audio to text |
| transl | translation to other language |
| trkr | tracker as in access tracker or geo tracker |
| TTPS | trusted third party server system |
| u/n | user name, see u/n and p/w, user name and password |
| unkn | unknown |
| URL | Uniform Resource Locator, x pointer, or other network locator, may be a mini-url for cell phone or PDA use |
| VOIP | voice over Internet Protocol |

General Description of System Components

It is important to know that the embodiments illustrated herein and described herein are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views. The processes described herein may be condensed or re-organized to achieve a more efficient system operation.

The present invention could be produced in hardware or software, or in a combination of hardware and software, and these implementations would be known to one of ordinary skill in the art. The system, or method, according to the inventive principles as disclosed in connection with the preferred embodiments, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk or CD, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits. A data store is any type of computer medium capable of storing digital data therein, that is, hard drives, flash drives, RAM, ROM, etc.

Furthermore, the computer readable medium may include computer readable information in a transitory state medium such as a network link and/or a network interface, including a wired network or a wireless network, that allow a computer to read such computer readable information.

The claims appended hereto are meant to cover modifications and changes within the scope and spirit of the present invention.

What is claimed is:

1. A method for recording identity data and enabling on demand services in a communications system wherein said communications system includes a plurality of telecommunications enabled devices, each with a speaker and a microphone for a telecommunications session, said plurality of telecommunications enabled devices communitively coupled via a telecommunications network to a communications station having an on demand recording and voice record storage function and wherein a telecommunications session between two enabled devices and said communications station includes transmission of data packets therebetween which include metadata identifying the sending enabled device and which include on demand control command data and transfer control token command data, the method comprising:
    at the communications station, assigning an on demand control token to a first enabled device engaged in said telecommunications session;
    monitoring all data packets;
    upon recognition of an on demand command request from said sending enabled device which matches said on demand token at the communications station, activating said on demand recording and voice record storage function; and,
    upon recognition of said transfer control token command data from said first enabled device at the communications station, reassigning said on demand control token to a second of said two enabled devices engaged in said telecommunications session.

2. A method for recording identity data and enabling on demand services as claimed in claim 1 wherein only said first enabled device is permitted to said on demand recording and voice record storage function based upon the assignment of said on demand control token to said first enabled device.

3. A method for recording identity data and enabling on demand services as claimed in claim 1 wherein said communications station recognizes a record ON command request and a record OFF command request from said first enabled device.

4. A method for recording identity data and enabling on demand services as claimed in claim 1 wherein said telecommunications session includes a subplurality of said enabled devices all communitively coupled together in said telecommunications session and wherein only said first enabled device activates said on demand recording and voice record storage function for said telecommunications session, to the exclusion of all others in said subplurality of said enabled devices.

5. A method for recording identity data and enabling on demand services as claimed in claim 4 wherein:
said communications station which provides real time indexing of the recording;
said communications station includes transmission of data packets which include discrete on demand recording control command data and transfer recording control token command data, and real time indexing control command data and transfer indexing control token command data; and
at the communications station, assigning the recording control token to one or the other of said enabled devices based upon permitted controls in a user profile associated with the respective enabled device and assigning the transfer recording control token to one or the other of said enabled devices based upon the associated permitted controls in the respective user profile;
at the communications station, assigning the indexing control token to one or the other of said enabled devices based upon permitted controls in a user profile associated with the respective enabled device and assigning the transfer indexing control token to one or the other of said enabled devices based upon the associated permitted controls in the respective user profile;
activating and deactivating recording based upon commands from the enabled device assigned with said recording control token;
activating and deactivating indexing based upon commands from the enabled device assigned with said indexing control token; and
transferring either or both of said recording control token and said indexing control token based upon corresponding transfer commands which effect the transfer of said recording control token and said indexing control token from one enabled device to another enabled device, said transfer commands received at said communications station.

6. A method for recording identity data and enabling on demand services as claimed in claim 4 wherein:
said communications station which provides real time supplementation of the recording;
said communications station includes transmission of data packets which include discrete on demand recording control command data and transfer recording control token command data, and real time supplementation control command data and transfer supplementation control token command data; and
at the communications station, assigning the recording control token to one or the other of said enabled devices based upon permitted controls in a user profile associated with the respective enabled device and assigning the transfer recording control token to one or the other of said enabled devices based upon the associated permitted controls in the respective user profile;
at the communications station, assigning the supplementation control token to one or the other of said enabled devices based upon permitted controls in a user profile associated with the respective enabled device and assigning the transfer supplementation control token to one or the other of said enabled devices based upon the associated permitted controls in the respective user profile;
activating and deactivating recording based upon commands from the enabled device assigned with said recording control token;
activating and deactivating supplementation based upon commands from the enabled device assigned with said supplementation control token; and
transferring either or both of said recording control token and said supplementation control token based upon corresponding transfer commands which effect the transfer of said recording control token and said supplementation control token from one enabled device to another enabled device, said transfer commands received at said communications station.

7. A method for recording identity data and enabling on demand services as claimed in claim 4 wherein:
said communications station which provides real time transcription of the recording;
said communications station includes transmission of data packets which include discrete on demand recording control command data and transfer recording control token command data, and real time transcription control command data and transfer transcription control token command data; and
at the communications station, assigning the recording control token to one or the other of said enabled devices based upon permitted controls in a user profile associated with the respective enabled device and assigning the transfer recording control token to one or the other of said enabled devices based upon the associated permitted controls in the respective user profile;
at the communications station, assigning the transcription control token to one or the other of said enabled devices based upon permitted controls in a user profile associated with the respective enabled device and assigning the transfer transcription control token to one or the other of said enabled devices based upon the associated permitted controls in the respective user profile;
activating and deactivating recording based upon commands from the enabled device assigned with said recording control token;
activating and deactivating transcription based upon commands from the enabled device assigned with said transcription control token; and
transferring either or both of said recording control token and said transcription control token based upon corresponding transfer commands which effect the transfer of said recording control token and said transcription control token from one enabled device to another enabled device, said transfer commands received at said communications station.

8. A method for recording identity data and enabling on demand services as claimed in claim 4 wherein:
said communications station which provides real time translation of the recording;
said communications station includes transmission of data packets which include discrete on demand recording control command data and transfer recording control token command data, and real time translation control command data and transfer translation control token command data; and
at the communications station, assigning the recording control token to one or the other of said enabled devices based upon permitted controls in a user profile associated with the respective enabled device and assigning the transfer recording control token to one or the other of said enabled devices based upon the associated permitted controls in the respective user profile;

at the communications station, assigning the translation control token to one or the other of said enabled devices based upon permitted controls in a user profile associated with the respective enabled device and assigning the transfer translation control token to one or the other of said enabled devices based upon the associated permitted controls in the respective user profile;

activating and deactivating recording based upon commands from the enabled device assigned with said recording control token;

activating and deactivating translation based upon commands from the enabled device assigned with said translation control token; and transferring either or both of said recording control token and said translation control token based upon corresponding transfer commands which effect the transfer of said recording control token and said translation control token from one enabled device to another enabled device, said transfer commands received at said communications station.

9. A method for recording identity data and enabling on demand services in a communications system via a communications station which provides on demand recording of sound, real time indexing of the recording, supplementation of the recording, transcription and translation, the communications system includes a plurality of telecommunications enabled devices, each with a speaker and a microphone, communitively coupled via a telecommunications network to the communications station, wherein a telecommunications session between two enabled devices and said communications station includes transmission of data packets therebetween which include metadata identifying the sending enabled device, on demand control command data and transfer control token command data, the method comprising:

at the communications station, assigning an on demand control token to a first enabled device engaged in said telecommunications session based upon permitted controls in a user profile associated with said first enabled device;

monitoring all data packets;

upon recognition of an on demand command request from said sending enabled device which matches said on demand token at the communications station, activating a corresponding on demand service at the communications station; and, upon recognition of said transfer control token command data from said first enabled device at the communications station, reassigning said on demand control token to a second of said two enabled devices engaged in said telecommunications session.

10. A method for recording identity data and enabling on demand services as claimed in claim 9 including:

enrolling said first enabled device with said user profile and associating hierarchical levels of said on demand recording of sound, real time indexing of the recording, supplementation of the recording, transcription and translation, based upon hierarchical levels of identity confirmation of said user with said first enabled device.

11. A computer readable medium containing non-transitory programming instructions for recording identity data and enabling on demand services in a communications system wherein said communications system includes a plurality of telecommunications enabled devices, each with a speaker and a microphone for a telecommunications session, said plurality of telecommunications enabled devices communitively coupled via a telecommunications network to a communications station having an on demand recording and voice record storage function and wherein a telecommunications session between two enabled devices and said communications station includes transmission of data packets therebetween which include metadata identifying the sending enabled device and which include on demand control command data and transfer control token command data, the method comprising:

at the communications station, assigning an on demand control token to a first enabled device engaged in said telecommunications session;

monitoring all data packets;

upon recognition of an on demand command request from said sending enabled device which matches said on demand token at the communications station, activating said on demand recording and voice record storage function; and, upon recognition of said transfer control token command data from said first enabled device at the communications station, reassigning said on demand control token to a second of said two enabled devices engaged in said telecommunications session.

12. A computer readable medium containing non-transitory programming instructions for recording identity data and enabling on demand services as claimed in claim 11 wherein only said first enabled device is permitted to said on demand recording and voice record storage function based upon the assignment of said on demand control token to said first enabled device.

13. A computer readable medium containing non-transitory programming instructions for recording identity data and enabling on demand services as claimed in claim 11 wherein said communications station recognizes a record ON command request and a record OFF command request from said first enabled device.

14. A computer readable medium containing non-transitory programming instructions for recording identity data and enabling on demand services as claimed in claim 11 wherein said telecommunications session includes a subplurality of said enabled devices all communitively coupled together in said telecommunications session and wherein only said first enabled device activates said on demand recording and voice record storage function for said telecommunications session, to the exclusion of all others in said subplurality of said enabled devices.

15. A computer readable medium containing non-transitory programming instructions for recording identity data and enabling on demand services as claimed in claim 14 wherein:

said communications station which provides real time indexing of the recording;

said communications station includes transmission of data packets which include discrete on demand recording control command data and transfer recording control token command data, and real time indexing control command data and transfer indexing control token command data; and at the communications station, assigning the recording control token to one or the other of said enabled devices based upon permitted controls in a user profile associated with the respective enabled device and assigning the transfer recording control token to one or the other of said enabled devices based upon the associated permitted controls in the respective user profile;

at the communications station, assigning the indexing control token to one or the other of said enabled devices based upon permitted controls in a user profile associated with the respective enabled device and assigning the transfer indexing control token to one or the other of said enabled devices based upon the associated permitted controls in the respective user profile;

activating and deactivating recording based upon commands from the enabled device assigned with said recording control token;

activating and deactivating indexing based upon commands from the enabled device assigned with said indexing control token; and transferring either or both of said recording control token and said indexing control token based upon corresponding transfer commands which effect the transfer of said recording control token and said indexing control token from one enabled device to another enabled device, said transfer commands received at said communications station.

16. A computer readable medium containing non-transitory programming instructions for recording identity data and enabling on demand services as claimed in claim 14 wherein:

said communications station which provides real time supplementation of the recording;

said communications station includes transmission of data packets which include discrete on demand recording control command data and transfer recording control token command data, and real time supplementation control command data and transfer supplementation control token command data; and at the communications station, assigning the recording control token to one or the other of said enabled devices based upon permitted controls in a user profile associated with the respective enabled device and assigning the transfer recording control token to one or the other of said enabled devices based upon the associated permitted controls in the respective user profile;

at the communications station, assigning the supplementation control token to one or the other of said enabled devices based upon permitted controls in a user profile associated with the respective enabled device and assigning the transfer supplementation control token to one or the other of said enabled devices based upon the associated permitted controls in the respective user profile;

activating and deactivating recording based upon commands from the enabled device assigned with said recording control token;

activating and deactivating supplementation based upon commands from the enabled device assigned with said supplementation control token; and transferring either or both of said recording control token and said supplementation control token based upon corresponding transfer commands which effect the transfer of said recording control token and said supplementation control token from one enabled device to another enabled device, said transfer commands received at said communications station.

17. A computer readable medium containing non-transitory programming instructions for recording identity data and enabling on demand services as claimed in claim 14 wherein:

said communications station which provides real time transcription of the recording;

said communications station includes transmission of data packets which include discrete on demand recording control command data and transfer recording control token command data, and real time transcription control command data and transfer transcription control token command data; and at the communications station, assigning the recording control token to one or the other of said enabled devices based upon permitted controls in a user profile associated with the respective enabled device and assigning the transfer recording control token to one or the other of said enabled devices based upon the associated permitted controls in the respective user profile;

at the communications station, assigning the transcription control token to one or the other of said enabled devices based upon permitted controls in a user profile associated with the respective enabled device and assigning the transfer transcription control token to one or the other of said enabled devices based upon the associated permitted controls in the respective user profile;

activating and deactivating recording based upon commands from the enabled device assigned with said recording control token;

activating and deactivating transcription based upon commands from the enabled device assigned with said transcription control token; and transferring either or both of said recording control token and said transcription control token based upon corresponding transfer commands which effect the transfer of said recording control token and said transcription control token from one enabled device to another enabled device, said transfer commands received at said communications station.

18. A computer readable medium containing non-transitory programming instructions for recording identity data and enabling on demand services as claimed in claim 14 wherein:

said communications station which provides real time translation of the recording;

said communications station includes transmission of data packets which include discrete on demand recording control command data and transfer recording control token command data, and real time translation control command data and transfer translation control token command data; and at the communications station, assigning the recording control token to one or the other of said enabled devices based upon permitted controls in a user profile associated with the respective enabled device and assigning the transfer recording control token to one or the other of said enabled devices based upon the associated permitted controls in the respective user profile;

at the communications station, assigning the translation control token to one or the other of said enabled devices based upon permitted controls in a user profile associated with the respective enabled device and assigning the transfer translation control token to one or the other of said enabled devices based upon the associated permitted controls in the respective user profile;

activating and deactivating recording based upon commands from the enabled device assigned with said recording control token;

activating and deactivating translation based upon commands from the enabled device assigned with said translation control token; and transferring either or both of said recording control token and said translation control token based upon corresponding transfer commands which effect the transfer of said recording control token and said translation control token from one enabled device to another enabled device, said transfer commands received at said communications station.

19. A computer readable medium containing non-transitory programming instructions for recording identity data and enabling on demand services in a communications system via a communications station which provides on demand recording of sound, real time indexing of the recording, supplementation of the recording, transcription and translation, the communications system includes a plurality of telecommunications enabled devices, each with a speaker and a microphone, communitively coupled via a telecommunications network to the communications station, wherein a telecommunications session between two enabled devices and said communications station includes transmission of data packets therebetween which include metadata identifying the sending enabled device, on demand control command data and transfer control token command data, the method comprising:

at the communications station, assigning an on demand control token to a first enabled device engaged in said telecommunications session based upon permitted controls in a user profile associated with said first enabled device;

monitoring all data packets;

upon recognition of an on demand command request from said sending enabled device which matches said on demand token at the communications station, activating a corresponding on demand service at the communications station; and, upon recognition of said transfer control token command data from said first enabled device at the communications station, reassigning said on demand control token to a second of said two enabled devices engaged in said telecommunications session.

20. A computer readable medium containing non-transitory programming instructions for recording identity data and enabling on demand services as claimed in claim 19 including:

enrolling said first enabled device with said user profile and associating hierarchical levels of said on demand recording of sound, real time indexing of the recording, supplementation of the recording, transcription and translation, based upon hierarchical levels of identity confirmation of said user with said first enabled device.

\* \* \* \* \*